H. S. McKAGUE.
PITMAN BEARING FOR LOCOMOTIVES.
APPLICATION FILED FEB. 17, 1916.
1,182,286. Patented May 9, 1916.
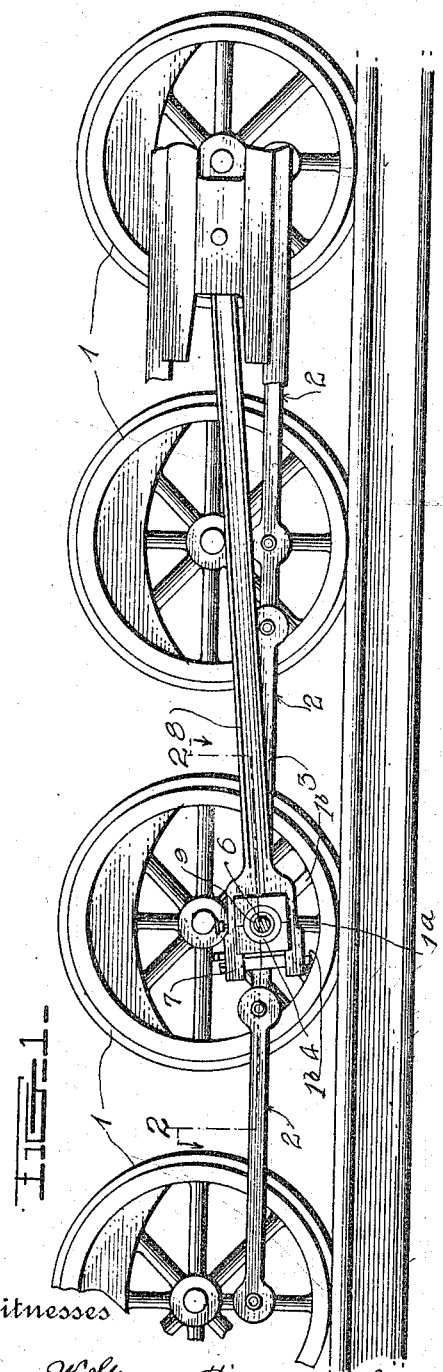
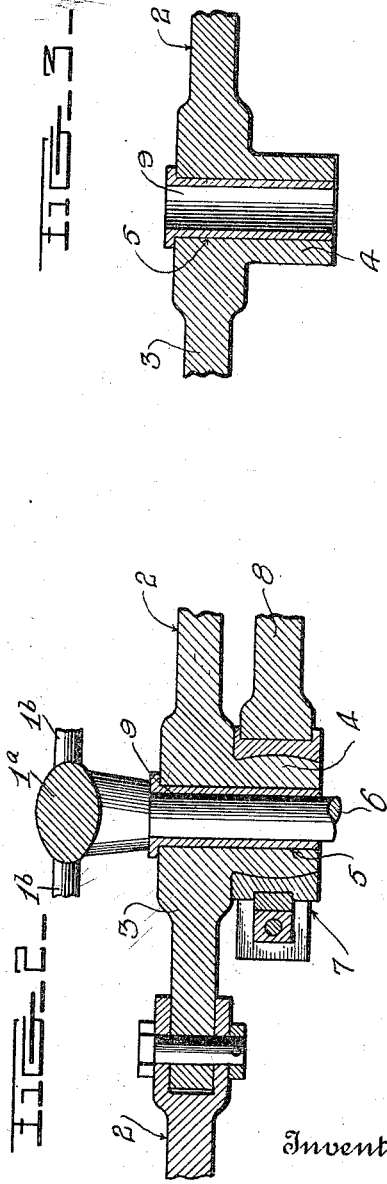
Inventor
H.S. McKAGUE

UNITED STATES PATENT OFFICE.

HERBERT SAMUEL McKAGUE, OF ALTOONA, PENNSYLVANIA.

PITMAN-BEARING FOR LOCOMOTIVES.

1,182,286.  Specification of Letters Patent.  Patented May 9, 1916.

Application filed February 17, 1916. Serial No. 78,926.

*To all whom it may concern:*

Be it known that I, HERBERT SAMUEL MCKAGUE, a citizen of the United States, residing at Altoona, in the county of Blair and State of Pennsylvania, have invented certain new and useful Improvements in Pitman-Bearings for Locomotives; and I do declare the following to be a full, clear, and exact description of the invention, such as will enable others skilled in the art to which it appertains to make and use the same.

My invention relates to improvements in locomotive details and more particularly to a bearing for connecting the pitman or driving rod to the connecting rod.

Heretofore, it has been the common practice to extend the main crank pin of the driving wheels through and beyond the connecting rod, and to connect the driving rod or pitman to the outer end of said pin. This causes all thrust from the pitman to be exerted on the outer end of the crank pin which is necessarily spaced a considerable distance from the wheel to which it is secured. Thus, the leverage exerted on the pin is so great as to angle the same in respect to the wheel. This wears out the bearings surrounding the crank pin in a very short time, as well as causing a great deal of friction which is of course extremely undesirable.

It is therefore the object of my invention to provide means whereby all thrust from the driving rod will be exerted directly on the connecting rod, while from the latter such thrust will be transferred to the inner end of the crank pin, at which point it will produce no injurious effects. This end is attained through the provision of certain novel features of construction to be hereinafter fully described and claimed, the descriptive matter being supplemented by the accompanying drawing which constitutes a part of this application and in which:—

Figure 1 is a side elevation of a portion of a locomotive running gear with the driving rod mounted in accordance with the present invention; Fig. 2 is a horizontal section taken on the plane indicated by the line 2—2 of Fig. 1; and Fig. 3 is a detail horizontal section showing a modified form of construction.

In specifically describing the construction shown in the drawings above briefly described, similar characters will be placed on corresponding parts throughout the several views and reference will be hereinafter made to the numerous elements by their respective indices. To this end, the numerals 1 designate the driving wheels of a locomotive, which wheels are synchronized in the usual manner by the provision of a connecting rod 2 formed of a number of sections pivoted together and also pivoted to the numerous wheels at points spaced a predetermined distance from the axes of the latter. The main section 3 of the connecting rod 2 is provided with a circular bearing stub 4 on its outer side, said stub being forged with the section 3 as shown, thus insuring that there be no relative movement between these two parts. A bore 5 is formed transversely through the section 3, one end of said bore opening through the inner side of said section, while the other end thereof opens through the outer end of the stub 4. This bore receives therein the main crank pin 6 projecting from one of the driving wheels 1. Although the pin 6 may be connected to its wheel 1 in any preferred manner, it is preferably secured to one of the spokes $1^a$ of said wheel, said spoke being held against vibration by the usual braces $1^b$ formed integrally therewith and with the rim of the wheel.

It is upon the stub 4 that the bearing 7 at the rear end of the driving or pitman rod 8 is mounted as shown clearly in the drawing. By this arrangement, no thrust will be exerted on the outer end of the crank pin 6, but all of such thrust will be imparted directly to the section 3 through the instrumentality of the stub 4. This thrust is now resisted at the inner end of the pin 6, at which point the aforesaid section contacts therewith. By placing all thrust at this point, the crank pin 6 will not be angled in respect to the wheel and thus excessive wearing of the bearings surrounding said pin will not take place. The elimination of thrust at the outer end of the pin 6 also eliminates the immense amount of friction heretofore existing between the pin in question and the bearings in which the same is received.

The bore 5 is shown in the present embodiment of the invention as provided with a bushing 9 of bronze or the like, it being understood that any desired type of bearing surface might well be used, the sleeve 9 being for illustrative purposes only.

The stub 4 may have its periphery curved transversely as shown in Fig. 2, or this stub may be constructed as depicted in Fig. 3. Furthermore, if stubs of other shapes be found to operate to advantage, it is to be understood that the present invention contemplates the use thereof.

From the foregoing description, taken in connection with the accompanying illustration, the construction and manner of operation of the improved arrangement will be readily understood without requiring a more extended explanation, and it will be obvious to those skilled in the art that the invention fulfils a long felt need in a simple and inexpensive manner.

I claim:

The combination with a locomotive driving wheel; of a connecting rod having formed integrally with its outer side a circular bearing stub, said rod having a transverse bore opening through its inner side and through the outer end of said stub, a crank pin projecting from the wheel through said bore to pivotally connect the rod with the wheel, and a driving rod having at its rear end a bearing receiving said stub, whereby all thrust from said driving rod will be exerted on the connecting rod through the instrumentality of the stub, and will be transferred from said connecting rod to the inner end of the crank pin at which point it will produce no injurious results.

In testimony whereof I have hereunto set my hand in presence of two subscribing witnesses.

HERBERT SAMUEL McKAGUE.

Witnesses:
D. OSCAR SHAVER,
H. E. LEVINE.